US010279618B2

(12) United States Patent
Degott et al.

(10) Patent No.: US 10,279,618 B2
(45) Date of Patent: May 7, 2019

(54) MAGNETIC OR MAGNETISABLE PIGMENT PARTICLES AND OPTICAL EFFECT LAYERS

(71) Applicant: SICPA HOLDING SA, Prilly (CH)

(72) Inventors: Pierre Degott, Crissier (CH); Mathieu Schmid, Lausanne (CH); Claude-Alain Despland, Prilly (CH); Cédric Amerasinghe, Les Cullayes (CH)

(73) Assignee: SICPA HOLDING SA, Prilly (CH)

( * ) Notice: Subject to any disclaimer, the term of this patent is extended or adjusted under 35 U.S.C. 154(b) by 405 days.

(21) Appl. No.: 14/910,091

(22) PCT Filed: Jul. 25, 2014

(86) PCT No.: PCT/EP2014/066047
§ 371 (c)(1),
(2) Date: Feb. 4, 2016

(87) PCT Pub. No.: WO2015/018663
PCT Pub. Date: Feb. 12, 2015

(65) Prior Publication Data
US 2016/0176223 A1   Jun. 23, 2016

(30) Foreign Application Priority Data
Aug. 5, 2013   (EP) .................................... 13179230

(51) Int. Cl.
*B42D 25/00*     (2014.01)
*B42D 25/369*   (2014.01)
(Continued)

(52) U.S. Cl.
CPC ............. *B42D 25/369* (2014.10); *B41M 1/42* (2013.01); *B41M 3/14* (2013.01); *B42D 25/00* (2014.10);
(Continued)

(58) Field of Classification Search
None
See application file for complete search history.

(56) References Cited

U.S. PATENT DOCUMENTS 2,418,479 A    4/1947  Carlton
2,570,856 A   10/1951  Pratt et al.
(Continued)

FOREIGN PATENT DOCUMENTS

CA    2 828 247    10/2012
CN    1968825       5/2007
(Continued)

OTHER PUBLICATIONS

Abstract translation of EP-2371907-A1 (Year: 2011).*
(Continued)

*Primary Examiner* — Kevin M Bernatz
(74) *Attorney, Agent, or Firm* — Muncy, Geissler, Olds & Lowe, P.C.

(57) ABSTRACT

The invention relates to the field of non-spherical magnetic or magnetisable pigment particles and coating compositions comprising those pigment particles for producing optical effect layers (OEL) wherein the magnetic or magnetisable pigment particles are magnetically oriented. In particular, the present invention provides uses of said optical effect layers (OEL) layers as anti-counterfeit means on security documents or security articles. In particular, it relates to the field of non-spherical magnetic or magnetisable pigment particles comprising a magnetic metal selected from the group consisting of cobalt, iron, gadolinium and nickel; a magnetic alloy of iron, manganese, cobalt, nickel, or a mixture of two or more thereof; a magnetic oxide of chromium, manganese, cobalt, iron, nickel or a mixture of two or more thereof; or a mixture of two or more thereof, and having a d50 value higher than 6 μm and lower than 13 μm, their uses in coating compositions comprising a binder
(Continued)

material for producing an optical effect layer (OEL), OEL obtained thereof and processes for producing said OEL.

21 Claims, 1 Drawing Sheet

(51) Int. Cl.
| | |
|---|---|
| C09C 1/62 | (2006.01) |
| C09D 5/36 | (2006.01) |
| C09D 5/38 | (2006.01) |
| B41M 1/42 | (2006.01) |
| B41M 3/14 | (2006.01) |
| B42D 25/378 | (2014.01) |
| D21H 21/48 | (2006.01) |
| C09D 7/62 | (2018.01) |
| B05D 3/00 | (2006.01) |
| B05D 5/06 | (2006.01) |
| B41M 7/00 | (2006.01) |

(52) U.S. Cl.
CPC .......... *B42D 25/378* (2014.10); *C09C 1/62* (2013.01); *C09D 5/36* (2013.01); *C09D 5/38* (2013.01); *C09D 7/62* (2018.01); *D21H 21/48* (2013.01); *B05D 3/207* (2013.01); *B05D 5/065* (2013.01); *B41M 7/0081* (2013.01); *C01P 2004/20* (2013.01); *C01P 2004/51* (2013.01); *C01P 2004/52* (2013.01); *C01P 2004/54* (2013.01); *C01P 2006/42* (2013.01); *C01P 2006/65* (2013.01); *C09C 2200/1054* (2013.01); *C09C 2200/1058* (2013.01); *C09C 2200/24* (2013.01)

(56) References Cited

U.S. PATENT DOCUMENTS

| | | | |
|---|---|---|---|
| 3,676,273 A | 7/1972 | Graves | |
| 3,791,864 A | 2/1974 | Steingroever | |
| 4,838,648 A | 6/1989 | Phillips et al. | |
| 5,364,689 A | 11/1994 | Kashiwagi et al. | |
| 5,630,877 A | 5/1997 | Kashiwagi et al. | |
| 6,103,361 A | 8/2000 | Batzar et al. | |
| 6,410,130 B1 | 6/2002 | Schumacher et al. | |
| 6,531,221 B1 | 3/2003 | Schumacher et al. | |
| 6,582,781 B1 | 6/2003 | Schumacher et al. | |
| 6,645,286 B2* | 11/2003 | Ostertag | B22F 1/0007 106/403 |
| 6,759,097 B2 | 7/2004 | Phillips et al. | |
| 6,777,085 B1* | 8/2004 | Argoitia | C09C 1/0015 428/328 |
| 6,818,299 B2 | 11/2004 | Phillips et al. | |
| 6,838,166 B2 | 1/2005 | Phillips et al. | |
| 7,047,883 B2 | 5/2006 | Raksha et al. | |
| 7,517,578 B2 | 4/2009 | Raksha et al. | |
| 8,025,952 B2 | 9/2011 | Raksha et al. | |
| 8,039,094 B2 | 10/2011 | Krietsch et al. | |
| 8,343,615 B2 | 1/2013 | Raksha et al. | |
| 2002/0160194 A1 | 1/2002 | Phillips et al. | |
| 2004/0009308 A1 | 1/2004 | Schlaf et al. | |
| 2004/0051297 A1 | 3/2004 | Raksha et al. | |
| 2010/0098921 A1* | 4/2010 | Burrows | C09D 11/037 428/206 |
| 2012/0091699 A1* | 4/2012 | Krueger | B42D 25/21 283/67 |
| 2012/0091701 A1* | 4/2012 | Krueger | C09D 7/69 283/72 |
| 2012/0107738 A1 | 5/2012 | Argoitia et al. | |
| 2012/0133121 A1* | 5/2012 | Bleikolm | B42D 25/29 283/67 |
| 2013/0084411 A1 | 4/2013 | Raksha et al. | |
| 2013/0112912 A1* | 5/2013 | Wolfrum | C09C 1/62 252/62.55 |
| 2014/0210200 A1* | 7/2014 | Bornschlegl | G07D 7/04 283/85 |

FOREIGN PATENT DOCUMENTS

| | | | |
|---|---|---|---|
| DE | 2 006 848 | 9/1971 | |
| DE | 10 2010 026 782 | 1/2012 | |
| DE | 10 2011 015 837 | 10/2012 | |
| EP | 0 406 667 | 1/1995 | |
| EP | 0 686 675 | 12/1995 | |
| EP | 0 710 508 | 5/1996 | |
| EP | 1 666 546 | 6/2006 | |
| EP | 1 710 756 | 10/2006 | |
| EP | 1 819 525 | 3/2010 | |
| EP | 2 165 774 | 3/2010 | |
| EP | 2 263 806 | 12/2010 | |
| EP | 2 263 807 | 12/2010 | |
| EP | 2 306 222 | 4/2011 | |
| EP | 2 325 677 | 5/2011 | |
| EP | 2371907 A1 * | 10/2011 | ........... A61K 8/0229 |
| EP | 2 402 401 | 1/2012 | |
| EP | 1 878 773 | 8/2012 | |
| EP | 1 674 282 | 6/2013 | |
| JP | 6163531 | 4/1986 | |
| JP | 2002024364 | 1/2002 | |
| JP | 2002080749 | 3/2002 | |
| JP | 2009525388 | 7/2009 | |
| JP | 2012523470 | 10/2012 | |
| RU | 2333230 | 9/2008 | |
| WO | 2002/073250 | 9/2002 | |
| WO | 2002/090002 | 11/2002 | |
| WO | 2003/000801 | 1/2003 | |
| WO | 2004/007095 | 1/2004 | |
| WO | 2004072186 | 8/2004 | |
| WO | 2005/002866 | 1/2005 | |
| WO | 2006/061301 | 1/2006 | |
| WO | 2006/063926 | 6/2006 | |
| WO | 2007/131833 | 11/2007 | |
| WO | 2008/046702 | 4/2008 | |
| WO | 2010/058026 | 5/2010 | |
| WO | 2010/115928 | 10/2010 | |
| WO | 2010115986 | 10/2010 | |
| WO | 2011/012520 | 2/2011 | |
| WO | 2011/092502 | 8/2011 | |
| WO | 2012/038531 | 3/2012 | |
| WO | 2012/104098 | 8/2012 | |

OTHER PUBLICATIONS

Abstract Translation of DE 10114446 A1 (Year: 2002).*
Russian office action and Search Report in counterpart Russian Application No. 2016107644 dated Jul. 24, 2017 (and English language translation of Relevant Excerpt).
Pfaff, "Special Effect Pigments", 2nd Revised Edition, 2008, pp. 43 and 116-117.
Lowe et al., *Chemistry & Technology of UV & EB Formulation for Coatings, Inks & Paint*, vol. IV, "Formulation," by John Wiley & Sons in association with SITA Technology Limited, 1996.
Crivello et al., *Chemistry & Technology of UV & EB Formulation for Coatings, Inks & Paint*, vol. III, "Photoinitiators for Free Radical Cationic and Anionic Polymerization", 2nd Edition, by John Wiley & Sons in association with SITA Technology Limited, 1998, PP.
Adams et al., "Printing Technology", Delmar Thomson Learning, 5th Edition, 2002, pp. 293, 332, and 352.
Baurle et al., "Coloristik fur Lackanwendungen", Farbe und Lack Edition , 2012, PP.
Michelson, "Studies in Optics", U. of Chicago Press, 1927, PP.
Chinese office action in counterpart Chinese Application No. 201480044193.9 dated Mar. 16, 2017 (and English language translation).
Japanese office action in counterpart Japanese Application No. P2016-532305 dated Sep. 19, 2017 (and English language translation).

(56) References Cited

OTHER PUBLICATIONS

Effect Pigments: Product specification ferricon "Metallic Inks and Pastes for 3D-Effects"; Apr. 1, 2012; 3 pgs.
Notice of Opposition issued in corresponding EP Patent No. EP3030618B1 dated Jun. 5, 2018 (and English language translation of relevant excerpts).
Metal and Effect Pigments; Eckart Effect Pigments, 6 pages.
Metal effect pigments for coatings; Eckart Effect Pigments, 6 pages.
Letter from Opponent issued in corresponding EP Patent No. EP3030618B1 dated Nov. 30, 2018 (and English language translation of relevant excerpts).

* cited by examiner

MAGNETIC OR MAGNETISABLE PIGMENT PARTICLES AND OPTICAL EFFECT LAYERS

FIELD OF THE INVENTION

The present invention relates to the field of non-spherical magnetic or magnetisable pigment particles and coating compositions comprising those pigment particles for producing optical effect layers (OELs) wherein the magnetic or magnetisable pigment particles are magnetically oriented. In particular, the present invention provides uses of said OELs as anti-counterfeit means on security documents or security articles. In addition or alternatively, the OELs may also be used for decorative purposes.

BACKGROUND OF THE INVENTION

It is known in the art to use inks, compositions, coatings or layers containing oriented magnetic or magnetisable pigment particles, particularly also optically variable magnetic or magnetisable pigment particles, for the production of security elements, e.g. in the field of security documents. Coatings or layers comprising oriented magnetic or magnetisable pigment particles are disclosed for example in U.S. Pat. No. 2,570,856; U.S. Pat. No. 3,676,273; U.S. Pat. No. 3,791,864; U.S. Pat. No. 5,630,877 and U.S. Pat. No. 5,364,689. Coatings or layers comprising oriented magnetic color-shifting pigment particles, resulting in particularly appealing optical effects, useful for the protection of security documents, have been disclosed in WO 2002/090002 A2 and WO 2005/002866 A1.

Security features, e.g. for security documents, can generally be classified into "covert" security features on the one hand, and "overt" security features on the other hand. The protection provided by covert security features relies on the concept that such features are difficult to detect, typically requiring specialized equipment and knowledge for detection, whereas "overt" security features rely on the concept of being easily detectable with the unaided human senses, e.g. such features may be visible and/or detectable via the tactile senses while still being difficult to produce and/or to copy. However, the effectiveness of overt security features depends to a great extent on their easy recognition as a security feature, because most users, and particularly those having no prior knowledge of the security features of a document or item secured therewith, will only then actually perform a security check based on said security feature if they have actual knowledge of their existence and nature.

Magnetic or magnetisable pigment particles in printing inks or coatings allow for the production of magnetically induced images, designs and/or patterns through the application of a corresponding magnetic field, causing a local orientation of the magnetic or magnetisable pigment particles in the unhardened coating, followed by hardening the latter. The result is a fixed magnetically induced image, design or pattern. Materials and technologies for the orientation of magnetic or magnetisable pigment particles in coating compositions have been disclosed in U.S. Pat. No. 2,418,479; U.S. Pat. No. 2,570,856; U.S. Pat. No. 3,791,864; DE 2006848-A, U.S. Pat. No. 3,676,273, U.S. Pat. No. 5,364,689, U.S. Pat. No. 6,103,361, EP 0 406 667 61; US 2002/0160194; US 2004/70062297; US 2004/0009308; EP 0 710 508 A1; WO 2002/09002 A2; WO 2003/000801 A2; WO 2005/002866 A1; WO 2006/061301 A1; these documents are incorporated herein by reference. In such a way, magnetically induced patterns which are highly resistant to counterfeit can be produced. The security element in question can only be produced by having access to both, the magnetic or magnetisable pigment particles or the corresponding ink, and the particular technology employed to print said ink and to orient said pigment in the printed ink.

The literature, such as for example in "Special Effect Pigments", G. Pfaff, $2^{nd}$ Revised Edition, 2008, pages 43 and 116-117, teaches that large reflective particles are preferred for producing images, designs or patterns because they have a large smooth surface, exhibit a uniform reflection of incident light thus leading to excellent lustre and brilliance, whereas small particles exhibit an increased light scattering and refraction thus causing reduced light reflection and inferior brilliance. Furthermore, it is known in the art that the qualities expressed by saturation, brightness, opacity of inks or compositions are affected by the size of the so-comprised pigment particles. For example, large optical effect pigment particles exhibit a higher chroma than corresponding smaller pigment particles. Therefore, the man skilled in the art typically uses reflective pigment particles having a large size, in particular optically variable pigment particles or optically variable magnetic or magnetisable pigment particles for producing optical effect layers. For example, the prior art discloses particles with an individual particle size lying in a range between 2 and 200 μm (microns). WO 2002/073250 A1 discloses optically variable magnetic or magnetisable pigment particles having a size between 20 and 30 μm. WO 2007/131833 A1 discloses coating compositions for producing magnetically induced images. It is further disclosed that, with the aim of getting saturated colours and abrupt colour changes, suitable optically variable magnetic or magnetisable pigment particles are characterized by a mean particle diameter (d50) typically ranging from 5 to 40 μm and preferably from 15 to 25 μm. WO 2011/012520 A2 discloses flake-shaped particles having a diameter of typically between 10 to 50 μm. WO 2006/061301 A1 discloses that a large particle size (flake diameter in the range of 10 to 50 μm) and a size distribution which is as homogeneous as possible, are desirable, in order to yield the optimum effect. U.S. Pat. No. 6,818,299 discloses pigment flakes having a dimension on any surface thereof ranging from 2 μm to 200 μm. US 2012/0107738 discloses flakes which are typically 5 μm to 100 μm across, more typically 20 μm to 40 μm across.

U.S. Pat. No. 8,025,952 discloses that the typical size of magnetic particles for inks is in the range of from 10 μm to 100 μm, more preferably in the range of from 18 to 30 μm. EP 2 402 401 A1 discloses pigment flakes having an average particle size between 2 and 20 μm.

Examples of dynamic security features based on magnetically induced images, designs or patterns providing the optical illusion of movement have been developed including without limitation rolling-bar effects and moving rings effects.

For example, U.S. Pat. No. 7,047,883 discloses the creation of a dynamic optically variable effect known as the "rolling bar" feature. The "rolling bar" feature provides the optical illusion of movement to images comprising oriented magnetic or magnetisable pigments. U.S. Pat. No. 7,517,578 and WO 2012/104098 A1 respectively disclose "double rolling bar" and "triple rolling bar" features, said features seeming to move against each other upon tilting. A printed "rolling bar" type image shows one or more contrasting bands which appear to move ("roll") as the image is tilted with respect to the viewing angle. Such images are known to be easily recognized by the man on the street and the illusive aspect cannot be reproduced by commonly available office equipment for color scanning, printing and copying. "Rolling bar" features are based on a specific orientation of magnetic or magnetisable pigments. In particular, the magnetic or magnetisable pigments are aligned in a curving fashion, either following a convex curvature (also referred in the art as negative curved orientation) or a concave curvature (also referred in the art as positive curved orientation). This effect is nowadays utilized for a number of security elements on banknotes, such as the "5" of the 5 Euro banknote or the "100" of the 100 Rand banknote of South Africa.

For example, U.S. Pat. No. 8,343,615, EP 0 232 567 07 A2, WO 2011/092502 and US 2013/0084411 disclose moving-ring images displaying an apparently moving ring with changing viewing angle ("rolling ring" or "moving ring" effect).

As taught by the prior art, optically reflective non-spherical pigment particles having a large size, in particular optically variable non-spherical pigment particles having a large size, have been widely preferred for producing optical effect layers. While there are only limited indications available in the art describing preferred particle sizes for reflective non-spherical magnetic or magnetisable pigment particles or optically variable non-spherical magnetic or magnetisable pigment particles, those indications also point towards large particle sizes to obtain magnetically oriented optical effect layers with high reflectivity, chroma and/or colorshifting properties.

However, the present inventors found that, in practice, the optical properties of such optical effect layers may suffer from the use of particles with inadequately selected sizes, particularly from sizes that are excessively large, even though these sizes were until now considered as fine to very fine. Moreover, the use of large size particles was found to have also some disadvantages as they require specific printing elements such as special screens for the screen printing process or engraved cylinders for flexography and rotogravure. In particular, the fact that the size of the mesh for the screen or the dimension of the engraved structures of the engraved cylinders must be large enough to be compatible with large particles, induces an increase of the thickness of the OEL with associated drawbacks of a reduced drying speed combined with an increased ink consumption.

Therefore, a need remains for optical effect layers based on magnetically oriented pigments particles and displaying an eye-catching dynamic effect, to provide, in combination, a high resolution and a high contrast with equivalent or improved reflectivity.

SUMMARY OF THE INVENTION

Accordingly, it is an object of the present invention to overcome the deficiencies of the prior art as discussed above. This is achieved by the provision of non-spherical magnetic or magnetisable pigment particles comprising a magnetic metal selected from the group consisting of cobalt, iron, gadolinium and nickel; a magnetic alloy of iron, manganese, cobalt, nickel, or a mixture of two or more thereof; a magnetic oxide of chromium, manganese, cobalt, iron, nickel or a mixture of two or more thereof; or a mixture of two or more thereof and having a d50 value higher than 6 μm and lower than 13 μm, preferably from about 7 μm to about 10 μm.

There are disclosed and claimed herein uses of the non-spherical magnetic or magnetisable pigment particles described herein in a coating composition comprising a binder material for producing an optical effect layer; coating compositions comprising a binder material and the non-spherical magnetic or magnetisable pigment particles described herein; OELs comprising the coating composition described herein in hardened form, wherein the non-spherical magnetic or magnetisable pigment particles are magnetically oriented; and security documents or decorative elements or objects comprising one or more OELs described herein.

Also described and claimed herein are processes for producing the OELs described herein and OELs obtained therefrom, said processes comprising the steps of:

a) applying on a substrate surface or on a supporting surface of a magnetic-field-generating device the coating composition described herein, said coating composition being in a first state, b) exposing the coating composition in a first state to the magnetic field of a magnetic-field-generating device, thereby orienting at least a part of the non-spherical magnetic or magnetisable pigment particles described herein, and c) hardening the coating composition to a second state so as to fix the non-spherical magnetic or magnetisable pigment particles in their adopted positions and orientations.

Also described and claimed herein are optical effect coated substrates comprising one or more OELs described herein on a substrate and uses of the OELs or OECs for the protection of a security document against counterfeiting or fraud or for a decorative application.

The present invention enables the use of smaller non-spherical magnetic or magnetisable pigment particles that were traditionally considered as a waste or as an inferior grade of the production of large magnetic or magnetisable pigment particles known in the art to produce high quality magnetically induced images. The non-spherical magnetic or magnetisable pigment particles described herein are advantageously used to produce optical effect layers exhibiting high brightness, high contrast, high resolution and reduced sparkling. Moreover, the non-spherical magnetic or magnetisable pigment particles described herein allow the production of OELs not suffering from an imperfect alignment of the pigment particles and a graininess as shown in the Examples described hereafter, said drawback being known when pigment particles with an inadequately selected particle size are used.

Furthermore, OELs based on the magnetic orientation of the non-spherical pigment particles described herein may allow the use of more classical or conventional printing elements, such as screen with smaller mesh size for screen printing or shallower engraved cylinder with smaller engravings for flexography and rotogravure. Moreover, the OELs described herein may also have a reduced thickness in comparison with the prior art thus exhibit an improvement of printing behaviour as well as a reduction of cost while maintaining or improving optical properties, resolution and reflectivity. Therefore, the non-spherical magnetic or magnetisable pigment particles described herein enable the preparation of OELs in a more efficient way and at a lower cost.

BRIEF DESCRIPTION OF DRAWINGS

The non-spherical magnetic or magnetisable pigment particles according to the present invention and OELs comprising said pigment particles are now described in more detail with reference to the drawings and to particular embodiments, wherein FIG. 1A-1F Photographic images of OELs exhibiting a rolling bar effect, said OELs comprising magnetically oriented non-spherical magnetic or magnetisable pigment particles of different sizes.

DETAILED DESCRIPTION

Definitions

Figures 1A, 1B, 1C, 1D, 1E, 1F:
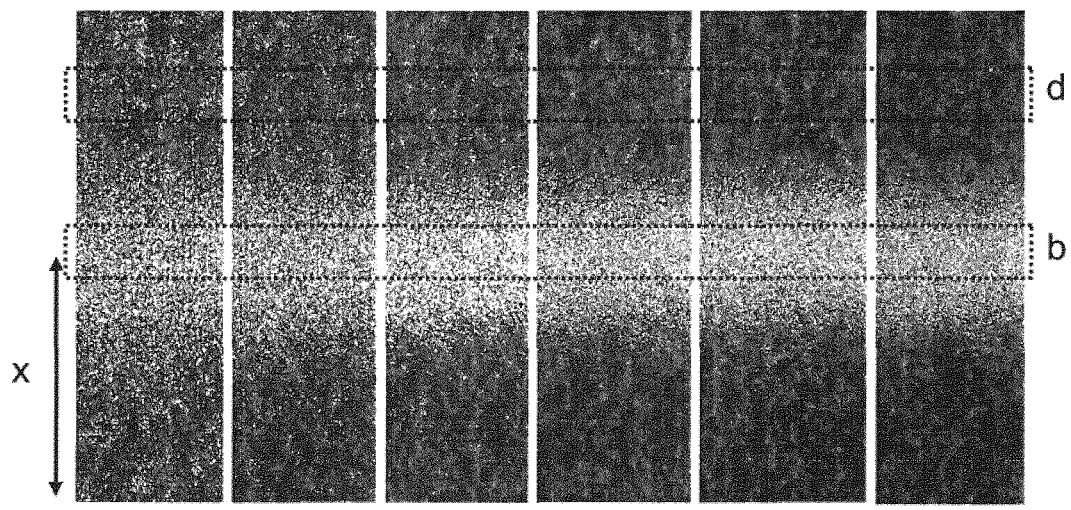

The following definitions are to be used to interpret the meaning of the terms discussed in the description and recited in the claims.

As used herein, the indefinite article "a" indicates one as well as more than one and does not necessarily limit its referent noun to the singular.

As used herein, the term "about" means that the amount, value or limit in question may be the specific value designated or some other value in its neighbourhood. Generally, the term "about" denoting a certain value is intended to denote a range within ±5% of the value. As one example, the phrase "about 100" denotes a range of 100±5, i.e. the range from 95 to 105. Generally, when the term 'about' is used, it can be expected that similar results or effects according to the invention can be obtained within a range of ±5% of the indicated value. However, a specific amount, value or limit supplemented with the term "about" is intended herein to disclose as well the very amount, value or limit as such, i.e. without the "about" supplement.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B".

The term "substantially parallel" refers to deviating less than 20° from parallel alignment. Preferably, the term "substantially parallel" refers to not deviating more than 10° from parallel alignment.

The term "at least partially" is intended to denote that the following property is fulfilled to a certain extent or completely. Preferably, the term denotes that the following property is fulfilled to at least 50% or more.

The terms "substantially" and "essentially" are used to denote that the following feature, property or parameter is either completely (entirely) realized or satisfied or to a major degree that does adversely affect the intended result. Thus, the term "substantially" or "essentially" preferably means at least 80%.

The term "comprising" as used herein is intended to be non-exclusive and open-ended. Thus, for instance a coating composition comprising a compound A may include other compounds besides A. However, the term "comprising" also covers, as a particular embodiment thereof, the more restrictive meanings of "consisting essentially of" and "consisting of", so that for instance "a coating composition comprising a compound A" may also (essentially) consist of the compound A.

The term "coating composition" refers to any composition which is capable of forming an optical effect layer on a solid substrate and which can be applied preferentially but not exclusively by a printing method. The coating composition comprises at least the non-spherical magnetic or magnetisable pigment particles described herein and a binder.

The term "optical effect layer (OEL)" as used herein denotes a layer that comprises oriented non-spherical magnetic or magnetisable pigment particles and a binder, wherein the orientation of the non-spherical magnetic or magnetisable pigment particles is fixed within the binder so as to form a magnetically induced image.

As used herein, the term "optical effect coated substrate (OEC)" is used to denote the product resulting from the provision of the OEL on a substrate. The OEC may consist of the substrate and the OEL, but may also comprise other materials and/or layers other than the OEL.

The term "security element" or "security feature" is used to denote an image or graphic element that can be used for authentication purposes. The security element or security feature can be an overt and/or a covert security element.

In one aspect, the present invention relates to non-spherical magnetic or magnetisable pigment particles comprising a magnetic material and having a d50 value higher than 6 μm and lower than 13 μm as well as their use in coating compositions for producing an optical effect layer or an optical effect coating; i.e. a substrate comprising one or more OEL. The OEL comprises non-spherical magnetic or magnetisable pigment particles that, due to their non-spherical shape, have a non-isotropic reflectivity. The non-spherical magnetic or magnetisable pigment particles are dispersed in a binder material being at least partially transparent to electromagnetic radiation of one or more wavelengths in the range of 200 nm to 2500 nm and have a specific orientation for providing a desired optical effect. The orientation is achieved by orienting the non-spherical magnetic or magnetisable pigment particles in accordance with an external magnetic field.

The non-spherical magnetic or magnetisable pigment particles described herein are defined as having, due to their non-spherical shape, non-isotropic reflectivity with respect to an incident electromagnetic radiation for which the hardened binder material is at least partially transparent. As used herein, the term "non-isotropic reflectivity" denotes that the proportion of incident radiation from a first angle that is reflected by a particle into a certain (viewing) direction (a second angle) is a function of the orientation of the particles, i.e. that a change of the orientation of the particle with respect to the first angle can lead to a different magnitude of the reflection to the viewing direction. Preferably, the non-spherical magnetic or magnetisable pigment particles described herein have a non-isotropic reflectivity with respect to incident electromagnetic radiation in some parts or in the complete wavelength range of from about 200 to about 2500 nm, more preferably from about 400 to about 700 nm, such that a change of the particle's orientation results in a change of reflection by that particle into a certain direction. As known by the man skilled in the art, the non-spherical magnetic or magnetisable pigment particles described herein are different from conventional pigments, said conventional pigment particles displaying the same color for all viewing angles, whereas the non-spherical magnetic or magnetisable pigment particles described herein exhibit non-isotropic reflectivity as described hereabove.

The non-spherical magnetic or magnetisable pigment particles, in particular non-spherical optically variable magnetic or magnetisable pigment particles, described herein are particularly suitable in coating compositions comprising a binder material for producing an optical effect layer, i.e. for producing a magnetically induced image.

The non-spherical magnetic or magnetisable pigment particles described herein are characterized by having a specific size. Herein the term "size" denotes a statistical property of the ensemble of non-spherical magnetic or magnetizable pigment particles. As known in the art, pigments, pigment particles, flake pigments and other comminuted materials can be characterized by measuring a particle size distribution (PSD) of a sample. Such PSDs typically describe the fractional amount (relative to total number, weight or volume) of particles in the sample as a function of a size-related characteristic of individual particles. A commonly used size-related characteristic describing individual particles is the "circle equivalent" (CE) diameter, which corresponds to the diameter of a circle that would have the same area as an orthographic projection of the particle. It is common in the art to express a PSD as the relative volume of particles as a function of the CE diameter, and for plate-like particles, the volume is calculated as proportional to the CE diameter to the power of 2. This definition of a PSD will be used throughout the present application. For convenience, statistics of PSDs are calculated from the results using the CE diameter rather than reporting the entire PSD. In this application, standard percentile readings are reported:

$D(v,50)$ (hereafter abbreviated as d50) is the value of the CE diameter, in microns, which separates the PSD in two parts of equal cumulated volume: the lower part represent 50% of the cumulated volume of all particles, corresponding to those particles with a CE diameter smaller than d50; the upper part represents 50% of the cumulated volume of particles, corresponding to those particles with a CE diameter larger than d50. D50 is also known as the median of the volume distribution of particles.

$D(v,90)$ (hereafter abbreviated as d90) is the value of the CE diameter, in microns, which separates the PSD into two parts with different cumulated volumes such that the lower part represents 90% of the cumulated volume of all particles, corresponding to those particles with a CE diameter smaller than d90, and the upper part represents 10% of the cumulated volume of particles, with a CE diameter larger than d90.

Similarly $D(v,10)$ (hereafter abbreviated as d10) is the value of the CE diameter, in microns, which separates the PSD into two parts with different cumulated volumes such that the lower part represents 10% of the cumulated volume of all particles, corresponding to those particles with a CE diameter smaller than d10, and the upper part represents 90% of the cumulated volume of particles with a CE diameter larger than d10.

For simplicity, the PSDs of non-spherical pigment materials considered in this application are characterised by d50 values of individual batches of material, preferably by a set of two statistical values: d50 values and d90 values.

A variety of experimental methods are available to measure PSDs including without limitation sieve analysis, electrical conductivity measurements (using a Coulter counter), laser diffraction and direct optical granulomtery. Direct optical granulometry was used to determine PSDs cited in this application (instrument: Malvern Morphologi G3; sample preparation: 0.2 wt-% pigment particle dispersion in a solvent-based varnish, screen-printed using a T90 mesh on glass microscope slides).

The size of the non-spherical magnetic or magnetisable pigment particles described herein have been selectively chosen so as to generate OELs exhibiting optimum optical properties for screen printing, rotogravure printing, flexography printing or equivalent methods used in the art.

The effect or consequence of using non-spherical magnetic or magnetisable pigment particles with an excessively large d50 value results in a poor alignment due to a limited ink layer thickness: if most pigment particles are too large compared to the film thickness of the coating composition, then the majority of pigment particles cannot align correctly in the dark areas, where the pigment particles would ideally be required to stand at a steep angle with respect to the substrate. Therefore, suitable non-spherical magnetic or magnetisable pigment particles for the present invention must have a d50 value which is significantly smaller than the ink layer thickness. For screen printing on banknotes, d50 must be lower than about 20 µm, preferably lower than about 15 µm. However, these conditions are not sufficient, and according to the present invention, a more refined set of criteria is required for the OEL to exhibit optimum optical properties. To illustrate this fact, high resolution photographs of OELs produced using platelet-shaped optically variable magnetic pigment particles with different PSD's were taken under identical conditions and are shown in FIGS. 1A-1F and FIGS. 2A-2F. Each photograph in FIGS. 1A-1F depicts a so-called rolling bar effect, with a bright central area (shallow pigment particle orientation) and dark upper and lower areas (steep pigment particle orientation). Each photograph in FIGS. 2A-2F depicts an indicium with a rolling bar effect, with dark and bright areas having, respectively, steep and shallow pigment particle orientations. The PSD statistics of the platelet-shaped optically variable magnetic pigment particles used to produce the OELs in each photograph are reported in Table 2.

Three negative consequences of the use of inadequately selected particle sizes and refined selection criteria according of the present invention are described herebelow:

1) Imperfect alignment discernible through the presence of bright sparkling dots within the optical effect layer contrasting with the color of the OEL. This can be observed in FIG. 1A and to a lesser extent in FIG. 1B, whereas FIGS. 1C-1F do not exhibit bright dots in the dark areas (labelled d). This phenomenon is mainly associated with the small fraction of excessively large particles present in the PSD, and best described by the d90 value. Therefore, suitable non-spherical magnetic or magnetisable pigment particles for the present invention preferably have a d90 value lower than 20 µm, preferably lower than or equal to about 15 µm.

2) Graininess and low resolution of image detail. As shown in FIGS. 2A-2F, FIGS. 2A and 2B show distinct graininess, and the 50-indicium is not as well defined as in FIG. 2C-2F. In contrast with point 1) described hereabove, here, the reflective "grains" which have a negative impact on resolution and/or readability are essentially present in the bright areas, in particular in the areas defining the contour of the 50-indicium. Graininess and low resolution are influenced by the size of the most frequent particle sizes in the PSD, i.e. d50 value, and not merely the few largest particles. Therefore, suitable non-spherical magnetic or magnetisable pigment particles for the present invention must have a d50 value lower than 13 µm, preferably lower than or equal to about 10 µm.

3) As shown in FIGS. 1A-1F, reflectivity of the bright areas (label b) is also affected by particle size. In this case, the larger size the pigment particles have, as taught in the art, the best reflectivity is obtained, and the general trend is that the brightness of the central "bright area" decreases with decreasing size. However, as can be seen in Table 2, an optimum value at d50=9.3 µm is obtained, where alignment is generally good, and size is not yet excessively small. The added condition is hence that the d50 value should not be excessively small. Here the majority of the non-spherical magnetic or magnetisable pigment particles are required to generate for optimum reflectivity. Therefore, suitable non-spherical magnetic or magnetisable pigment particles for the present invention must have a d50 value higher than 6 µm, preferably higher than or equal to about 7 µm.

4) Finally, imperfect alignment of the few largest (d90) pigment particles in dark areas as discussed in point 1) hereabove, in combination with a reduced reflectivity of an excessively small median particle size (d50) discussed in case 3) above can lead to reduced effect visibility or contrast. The resulting pixel values and contrast calculations shown in Table 2 confirm that optimum values are obtained for non-spherical magnetic or magnetisable pigment particles with a d50 value approximately equal to 9.3 µm in combination with a d90 value lower than or equal to 15 µm.

Therefore, the non-spherical magnetic or magnetisable pigment particles described herein have a d50 value higher than 6 µm and lower than 13 µm, preferably from about 7 µm to about 10 µm. Preferably, the non-spherical magnetic or magnetisable pigment particles described herein have a d50 value higher than 6 µm and lower than 13 µm, preferably from about 7 µm to about 10 µm, in combination with a d90 value lower than 20 µm, preferably lower than or equal to about 15 µm and more preferably from higher or equal to about 8 µm and lower than 20 µm and still more preferably from about 8 µm to about 15 µm.

Due to their magnetic characteristics, the non-spherical magnetic or magnetisable pigment particles described herein are machine readable, and therefore coating compositions comprising those pigment particles may be detected for example with specific magnetic detectors. Therefore, coating compositions comprising the non-spherical magnetic or magnetisable pigment particles described herein may be used as a covert or semi-covert security element (authentication tool) for security documents.

In the OELs described herein, the non-spherical magnetic or magnetisable pigment particles are provided in such a manner as to form a dynamic element, in particular a dynamic security element. Herein, the term "dynamic" denotes that the appearance and the light reflection of the element changes depending on the viewing angle. Put differently, the appearance of the security element is different when viewed from different angles, i.e. the security element exhibits a different appearance e.g. when viewed from a viewing angle of about 90° as compared to a viewing angle of about 22.5°, both with respect to the plane of the OEL. This behaviour is caused by the orientation of the non-spherical magnetic or magnetisable pigment particles, in particular non-spherical optically variable magnetic or magnetisable pigment particles, having non-isotropic reflectivity and/or by the properties of the non-spherical magnetic or magnetisable pigment particles as such, having a viewing angle dependent appearance (such as optically variable pigment particles described later).

Preferably, the non-spherical magnetic or magnetisable pigment particles are prolate or oblate ellipsoid-shaped, platelet-shaped or needle-shaped particles or a mixture of two or more thereof and more preferably platelet-shaped particles. Thus, even if the intrinsic reflectivity per unit surface area (e.g. per µm²) is uniform across the whole surface of such particle, due to its non-spherical shape, the reflectivity of the particle is non-isotropic as the visible area of the particle depends on the direction from which it is viewed. In one embodiment, the non-spherical magnetic or magnetisable pigment particles having non-isotropic reflectivity due to their non-spherical shape may further have an intrinsic non-isotropic reflectivity, such as for instance in optically variable magnetic pigment particles, due to their structure comprising layers of different reflectivity and refractive indexes. In this embodiment, the non-spherical magnetic or magnetisable pigment particles comprise non-spherical magnetic or magnetisable pigment particles having intrinsic non-isotropic reflectivity, such as non-spherical optically variable magnetic or magnetisable pigment particles.

Suitable examples of non-spherical magnetic or magnetisable pigment particles described herein include without limitation pigment particles comprising a magnetic metal selected from the group consisting of cobalt (Co), iron (Fe), gadolinium (Gd) and nickel (Ni); a magnetic alloy of iron, manganese, cobalt, nickel or a mixture of two or more thereof; a magnetic oxide of chromium, manganese, cobalt, iron, nickel or a mixture of two or more thereof; or a mixture of two or more thereof. The term "magnetic" in reference to the metals, alloys and oxides is directed to ferromagnetic or ferrimagnetic metals, alloys and oxides. The non-spherical magnetic or magnetisable pigment particles including pigment particles comprising a magnetic metal or a magnetic alloy described herein are preferably prolate or oblate ellipsoid-shaped, platelet-shaped or needle-shaped particles or a mixture of two or more thereof and more preferably platelet-shaped particles. Magnetic oxides of chromium, manganese, cobalt, iron, nickel or a mixture of two or more thereof may be pure or mixed oxides. Examples of magnetic oxides include without limitation iron oxides such as hematite ($Fe_2O_3$), magnetite ($Fe_3O_4$), chromium dioxide ($CrO_2$), magnetic ferrites ($MFe_2O_4$), magnetic spinets ($MR_2O_4$), magnetic hexaferrites ($MFe_{12}O_{19}$), magnetic orthoferrites ($RFeO_3$), magnetic garnets $M_3R_2(AO_4)_3$, wherein M stands for two-valent metal, R stands for three-valent metal, and A stands for four-valent metal.

Examples of non-spherical magnetic or magnetisable pigment particles described herein include without limitation pigment particles comprising a magnetic layer M made from one or more of a magnetic metal such as cobalt (Co), iron (Fe), gadolinium (Gd) or nickel (Ni); and a magnetic alloy of iron, cobalt or nickel, wherein said non-spherical magnetic or magnetisable pigment particles may be multilayered structures comprising one or more additional layers. Preferably, the one or more additional layers are layers A independently made from one or more selected from the group consisting of metal fluorides such as magnesium fluoride ($MgF_2$), silicium oxide (SiO), silicium dioxide ($SiO_2$), titanium oxide ($TiO_2$), and aluminium oxide ($Al_2O_3$), more preferably silicium dioxide ($SiO_2$); or layers B independently made from one or more selected from the group consisting of metals and metal alloys, preferably selected from the group consisting of reflective metals and reflective metal alloys, and more preferably selected from the group consisting of aluminium (Al), chromium (Cr), and nickel (Ni), and still more preferably aluminium (Al); or a combination of one or more layers A such as those described hereabove and one or more layers B such as those described hereabove. Typical examples of the non-spherical magnetic or magnetisable pigment particles being multilayered structures described hereabove include without limitation AIM multilayer structures, A/M/A multilayer structures, A/M/B multilayer structures, A/B/M/A multilayer structures, A/B/M/B multilayer structures, A/B/M/B/A/multilayer structures, B/M multilayer structures, B/M/B multilayer structures, B/A/M/A multilayer structures, B/A/M/B multilayer structures, B/A/M/B/A/multilayer structures, wherein the layers A, the magnetic layers M and the layers B are chosen from those described hereabove.

Optically variable elements, such as for example pigments particles, inks, coatings or layers are known in the field of security printing. Optically variable elements (also referred in the art as colorshifting or goniochromatic elements) exhibit a viewing-angle or incidence-angle dependent color, and are used to protect banknotes and other security documents against counterfeiting and/or illegal reproduction by commonly available color scanning, printing and copying office equipment.

The non-spherical magnetic or magnetisable pigment particles may comprise non-spherical optically variable magnetic or magnetisable pigment particles and/or non-spherical magnetic or magnetisable pigment particles having no optically variable properties. Preferably, at least a part of the non-spherical magnetic or magnetisable pigment particles described herein is constituted by non-spherical optically variable magnetic or magnetisable pigment particles. Such non-spherical optically variable magnetic or magnetisable pigment particles are preferably prolate or oblate ellipsoid-shaped, platelet-shaped or needle-shaped particles, or a mixture of two or more thereof, and more preferably are platelet-shaped particles.

In addition to the overt security provided by the colorshifting property of the non-spherical optically variable magnetic or magnetisable pigment particles, which allows easily detecting, recognizing and/or discriminating an article or security document carrying an ink, coating composition, coating or layer comprising the non-spherical optically variable magnetic or magnetisable pigment particles described herein from their possible counterfeits using the unaided human senses, the optical properties of the non-spherical optically variable magnetic or magnetisable pigment particles may also be used as a machine readable tool for the recognition of the OEL. Thus, the optical properties of the non-spherical optically variable magnetic or magnetisable pigment particles may simultaneously be used as a covert or semi-covert security feature in an authentication process wherein the optical (e.g. spectral) properties of the pigment particles are analyzed.

The use of non-spherical optically variable magnetic or magnetisable pigment particles in coating compositions for producing an OEL enhances the significance of the OEL as a security feature in security document applications, because such materials (i.e. non-spherical optically variable magnetic or magnetisable pigment particles) are reserved to the security document printing industry and are not commercially available to the public.

As mentioned above, preferably at least a part of the non-spherical magnetic or magnetisable pigment particles is constituted by non-spherical optically variable magnetic or magnetisable pigment particles. These can more preferably be selected from the group consisting of magnetic thin-film interference pigment particles, magnetic cholesteric liquid crystal pigment particles, interference coated pigment particles comprising a magnetic material and mixtures of two or more thereof. The magnetic thin-film interference pigment particles, magnetic cholesteric liquid crystal pigment particles and interference coated pigment particles comprising a magnetic material described herein are preferably prolate or oblate ellipsoid-shaped, platelet-shaped or needle-shaped particles or a mixture of two or more thereof and more preferably platelet-shaped particles.

Magnetic thin film interference pigment particles are known to those skilled in the art and are disclosed e.g. in U.S. Pat. No. 4,838,648; WO 2002/073250 A2; EP 0 686 675 B1; WO 2003/000801 A2; U.S. Pat. No. 6,838,166; WO 2007/131833 A1; EP 2 402 401 A1 and in the documents cited therein. Preferably, the magnetic thin film interference pigment particles comprise pigment particles having a five-layer Fabry-Perot multilayer structure and/or pigment particles having a six-layer Fabry-Perot multilayer structure and/or pigment particles having a seven-layer Fabry-Perot multilayer structure.

Preferred five-layer Fabry-Perot multilayer structures consist of absorber/dielectric/reflector/dielectric/absorber multilayer structures wherein the reflector and/or the absorber is also a magnetic layer, preferably the reflector and/or the absorber is a magnetic layer comprising nickel, iron and/or cobalt, and/or a magnetic alloy comprising nickel, iron and/or cobalt and/or a magnetic oxide comprising nickel (Ni), iron (Fe) and/or cobalt (Co).

Preferred six-layer Fabry-Perot multilayer structures consist of absorber/dielectric/reflector/magnetic/dielectric/absorber multilayer structures.

Preferred seven-layer Fabry Perot multilayer structures consist of absorber/dielectric/reflector/magnetic/reflector/dielectric/absorber multilayer structures such as disclosed in U.S. Pat. No. 4,838,648.

Preferably, the reflector layers described herein are independently made from one or more selected from the group consisting of metals and metal alloys, preferably selected from the group consisting of reflective metals and reflective metal alloys, more preferably selected from the group consisting of aluminium (Al), silver (Ag), copper (Cu), gold (Au), platinum (Pt), tin (Sn), titanium (Ti), palladium (Pd), rhodium (Rh), niobium (Nb), chromium (Cr), nickel (Ni), and alloys thereof, even more preferably selected from the group consisting of aluminium (Al), chromium (Cr), nickel (Ni) and alloys thereof, and still more preferably aluminium (Al). Preferably, the dielectric layers are independently made from one or more selected from the group consisting of metal fluorides such as magnesium fluoride ($MgF_2$), aluminium fluoride ($AlF_3$), cerium fluoride ($CeF_3$), lanthanum fluoride ($LaF_3$), sodium aluminium fluorides (e.g. $Na_3AlF_6$), neodymium fluoride ($NdF_3$), samarium fluoride ($SmF_3$), barium fluoride ($BaF_2$), calcium fluoride ($CaF_2$), lithium fluoride (LiF), and metal oxides such as silicium oxide (SiO), silicium dioxide ($SiO_2$), titanium oxide ($TiO_2$), aluminium oxide ($Al_2O_3$), more preferably selected from the group consisting of magnesium fluoride ($MgF_2$) and silicium dioxide ($SiO_2$) and still more preferably magnesium fluoride ($MgF_2$). Preferably, the absorber layers are independently made from one or more selected from the group consisting of aluminium (Al), silver (Ag), copper (Cu), palladium (Pd), platinum (Pt), titanium (Ti), vanadium (V), iron (Fe) tin (Sn), tungsten (W), molybdenum (Mo), rhodium (Rh), Niobium (Nb), chromium (Cr), nickel (Ni), metal oxides thereof, metal sulfides thereof, metal carbides thereof, and metal alloys thereof, more preferably selected from the group consisting of chromium (Cr), nickel (Ni), metal oxides thereof, and metal alloys thereof, and still more preferably selected from the group consisting of chromium (Cr), nickel (Ni), and metal alloys thereof. Preferably, the magnetic layer comprises nickel (Ni), iron (Fe) and/or cobalt (Co); and/or a magnetic alloy comprising nickel (Ni), iron (Fe) and/or cobalt (Co); and/or a magnetic oxide comprising nickel (Ni), iron (Fe) and/or cobalt (Co). When magnetic thin film interference pigment particles comprising a seven-layer Fabry-Perot structure are preferred, it is particularly preferred that the magnetic thin film interference pigment particles comprise a seven-layer Fabry-Perot absorber/dielectric/reflector/magnetic/reflector/dielectric/absorber multilayer structure consisting of a $Cr/MgF_2/Al/Ni/Al/MgF_2/Cr$ multilayer structure.

The magnetic thin film interference pigment particles described herein may be multilayer pigment particles being considered as safe for human health and the environment and being based for example on five-layer Fabry-Perot multilayer structures, six-layer Fabry-Perot multilayer structures and seven-layer Fabry-Perot multilayer structures, wherein said pigment particles include one or more magnetic layers comprising a magnetic alloy having a substantially nickel-free composition including about 40 wt-% to about 90 wt-% iron, about 10 wt-% to about 50 wt-% chromium and about 0 wt-% to about 30 wt-% aluminium. Typical examples of multilayer pigment particles being considered as safe for human health and the environment can be found in EP 2 402 401 A1 which is hereby incorporated by reference in its entirety.

Magnetic thin film interference pigment particles described herein are typically manufactured by a conventional deposition technique of the different required layers onto a web. After deposition of the desired number of layers, e.g. by physical vapour deposition (PVD), chemical vapour deposition (CVD) or electrolytic deposition, the stack of layers is removed from the web, either by dissolving a release layer in a suitable solvent, or by stripping the material from the web. The so-obtained material is then broken down to flakes which have to be further processed by grinding, milling (such as for example jet milling processes) or any suitable method so as to obtain pigment particles of the required size. The resulting product consists of flat flakes with broken edges, irregular shapes and different aspect ratios. Further information on the preparation of suitable magnetic thin film interference pigment particles can be found e.g. in EP 1 710 756 A1 and EP 1 666 546 A1 which are hereby incorporated by reference.

Suitable magnetic cholesteric liquid crystal pigment particles exhibiting optically variable characteristics include without limitation magnetic monolayered cholesteric liquid crystal pigment particles and magnetic multilayered cholesteric liquid crystal pigment particles. Such pigment particles are disclosed for example in WO 2006/063926 A1, U.S. Pat. No. 6,582,781 and U.S. Pat. No. 6,531,221. WO 2006/063926 A1 discloses monolayers and pigment particles obtained therefrom with high brilliance and colorshifting properties with additional particular properties such as magnetizability. The disclosed monolayers and pigment particles, which are obtained therefrom by comminuting said monolayers, include a three-dimensionally crosslinked cholesteric liquid crystal mixture and magnetic nanoparticles. U.S. Pat. No. 6,582,781 and U.S. Pat. No. 6,410,130 disclose platelet-shaped cholesteric multilayer pigment particles which comprise the sequence $A^1/B/A^2$, wherein $A^1$ and $A^2$ may be identical or different and each comprises at least one cholesteric layer, and B is an interlayer absorbing all or some of the light transmitted by the layers $A^1$ and $A^2$ and imparting magnetic properties to said interlayer. U.S. Pat. No. 6,531,221 discloses platelet-shaped cholesteric multilayer pigment particles which comprise the sequence A/B and optionally C, wherein A and C are absorbing layers comprising pigment particles imparting magnetic properties, and B is a cholesteric layer.

Suitable interference coated pigments comprising one or more magnetic materials include without limitation structures consisting of a substrate selected from the group consisting of a core coated with one or more layers, wherein at least one of the core or the one or more layers have magnetic properties. For example, suitable interference coated pigments comprise a core made of a magnetic material such as those described hereabove, said core being coated with one or more layers made of one or more metal oxides, or they have a structure consisting of a core made of synthetic or natural micas, layered silicates (e.g. talc, kaolin and sericite), glasses (e.g. borosilicates), silicium dioxides ($SiO_2$), aluminium oxides ($Al_2O_3$), titanium oxides ($TiO_2$), graphites and mixtures of two or more thereof. Furthermore, one or more additional layers such as colouring layers may be present.

The non-spherical magnetic or magnetisable pigment particles described herein may be surface treated so as to protect them against any deterioration that may occur in the coating composition and/or to facilitate their incorporation in the coating composition; typically corrosion inhibitor materials and/or wetting agents may be used.

Preferably, the coating composition described herein comprises the non-spherical magnetic or magnetisable pigment particles described herein, in particular non-spherical optically variable magnetic or magnetisable pigment particles, dispersed in a binder material. Preferably, the non-spherical magnetic or magnetisable pigment particles are present in an amount from about 2 wt-% to about 40 wt-%, more preferably about 4 wt-% to about 30 wt-%, the weight percents being based on the total weight of the coating composition comprising the binder material, the non-spherical magnetic or magnetisable pigment particles and other optional components of the coating composition.

In addition to the non-spherical magnetic or magnetisable pigment particles (which may or may not comprise or consist of non-spherical optically variable magnetic or magnetisable pigment particles), also non-magnetic or non-magnetisable pigment particles may be comprised in the coating compositions described herein. These particles may be color organic or inorganic pigment particles known in the art, having or not having optically variable properties. Further, the particles may be spherical or non-spherical and may have isotropic or non-isotropic optical reflectivity.

If the coating composition is to be provided on a substrate surface or a supporting surface of a magnetic-field-generating device, it is necessary that the coating composition comprising at least the binder material and the non-spherical magnetic or magnetisable pigment particles is in form that allows processing of the coating composition, e.g. by a printing process, in particular screen printing, rotogravure printing and flexography printing, to thereby apply the coating composition to the substrate surface, such as a paper substrate or those described hereafter or to the supporting surface of a magnetic-field-generating device. Further, after application of the coating composition, the non-spherical magnetic or magnetisable pigment particles are oriented by applying a magnetic field, aligning the non-spherical magnetic or magnetisable pigment particles along the field lines. Subsequently or partially simultaneously with the step of orienting/aligning the non-spherical magnetic or magnetisable pigment particles by applying a magnetic field, the orientation of the non-spherical magnetic or magnetisable pigment particles is fixed or frozen. The coating composition must thus noteworthy have a first state, i.e. a liquid or pasty state, wherein the coating composition is wet or soft enough, so that the non-spherical magnetic or magnetisable pigment particles dispersed in the coating composition are freely movable, rotatable and/or orientable upon exposure to a magnetic field, and a second hardened (e.g. solid) state, wherein the non-spherical pigment particles are fixed or frozen in their respective positions and orientations. By "partially simultaneously", it is meant that both steps are partly performed simultaneously, i.e. the times of performing each of the steps partially overlap. In the context of the present invention, when the hardening step c) is performed partially simultaneously with the orientation step b), it must be understood that step c) must become effective after step b) so that particles orient before complete hardening of the QEL.

Such a first and second state is preferably provided by using a certain type of coating composition. For example, the components of the coating composition other than the non-spherical magnetic or magnetisable pigment particles may take the form of an ink or coating composition such as those which are used in security applications, e.g. for banknote printing.

The aforementioned first and second state can be provided by using a material that shows a great increase in viscosity in reaction to a stimulus such as for example a temperature change or an exposure to an electromagnetic radiation. That is, when the fluid binder material is hardened or solidified, said binder material converts into the second state, i.e. a hardened or solid state, where the non-spherical magnetic or magnetisable pigment particles are fixed in their current positions and orientations and can no longer move nor rotate within the binder material.

As known to those skilled in the art, ingredients comprised in an ink or coating composition to be applied onto a surface such as a substrate and the physical properties of said ink or coating composition are determined by the nature of the process used to transfer the ink or coating composition to the surface. Consequently, the binder material comprised in the ink or coating composition described herein is typically chosen among those known in the art and depends on the coating or printing process used to apply the ink or coating composition and the chosen hardening process.

After application of the coating composition on a substrate or on a supporting surface of a magnetic-field-generating device and orientation of the non-spherical magnetic or magnetisable pigment particles, in particular non-spherical optically variable magnetic or magnetisable pigment particles, the coating composition is hardened (i.e. turned to a solid or solid-like state) in order to fix the orientation of the particles.

The hardening can be of purely physical nature, e.g. in cases where the coating composition comprises a polymeric binder material and a solvent and is applied at high temperatures. Then, the non-spherical magnetic or magnetisable are oriented at high temperature by the application of a magnetic field, and the solvent is evaporated, followed by cooling of the coating composition. Thereby the coating composition is hardened and the orientation of the particles is fixed.

Alternatively and preferably, the "hardening" of the coating composition involves a chemical reaction, for instance by curing, which is not reversed by a simple temperature increase (e.g. up to 80° C.) that may occur during a typical use of a security document. The term "curing" or "curable" refers to processes including the chemical reaction, cross-linking or polymerization of at least one component in the applied coating composition in such a manner that it turns into a polymeric material having a greater molecular weight than the starting substances. Preferably, the curing causes the formation of a stable three-dimensional polymeric network.

Such a curing is generally induced by applying an external stimulus to the coating composition (i) after its application on a substrate surface or a supporting surface of a magnetic-field-generation device and (ii) subsequently or partially simultaneously with the orientation of the magnetic or magnetisable pigment particles. Advantageously the hardening/curing of the coating composition described herein is carried out partially simultaneously with the orientation of the magnetic or magnetisable pigment particles. Therefore, preferably the coating composition is an ink or coating composition selected from the group consisting of radiation curable compositions, thermally drying compositions, oxidatively drying compositions, and combinations thereof. Particularly preferably, the coating composition is an ink or coating composition selected from the group consisting of radiation curable compositions. Radiation curing, in particular UV-Vis curing, advantageously leads to an instantaneous increase in viscosity of the coating composition after exposure to the curing radiation, thus preventing any further movement of the pigment particles and in consequence any loss of information after the magnetic orientation step.

Preferable radiation curable compositions include compositions that may be cured by UV-visible light radiation (hereafter referred as UV-Vis-curable) or by E-beam radiation (hereafter referred as EB). Radiation curable compositions are known in the art and can be found in standard textbooks such as the series "Chemistry & Technology of UV & EB Formulation for Coatings, Inks & Paints", Volume IV, Formulation, by C. Lowe, G. Webster, S. Kessel and I. McDonald, 1996 by John Wiley & Sons in association with SITA Technology Limited.

According to one particularly preferred embodiment of the present invention, the coating composition described herein is a UV-Vis-curable coating composition. UV-Vis curing advantageously allows very fast curing processes and hence drastically decreases the preparation time of the OEL described herein, OEC described herein and articles and documents comprising said OEL. Preferably, the UV-Vis-curable coating composition comprises one or more compounds selected from the group consisting of radically curable compounds and cationically curable compounds. The UV-Vis-curable coating composition described herein may be a hybrid system and comprise a mixture of one or more cationically curable compounds and one or more radically curable compounds. Cationically curable compounds are cured by cationic mechanisms typically including the activation by radiation of one or more photoinitiators which liberate cationic species, such as acids, which in turn initiate the curing so as to react and/or cross-link the monomers and/or oligomers to thereby harden the coating composition. Radically curable compounds are cured by free radical mechanisms typically including the activation by radiation of one or more photoinitiators, thereby generating radicals which in turn initiate the polymerization so as to harden the coating composition. Depending on the monomers, oligomers or prepolymers used to prepare the binder comprised in the UV-Vis-curable coating compositions described herein, different photoinitiators might be used. Suitable examples of free radical photoinitiators are known to those skilled in the art and include without limitation acetophenones, benzophenones, benzyldimethyl ketals, alpha-aminoketones, alpha-hydroxyketones, phosphine oxides and phosphine oxide derivatives, as well as mixtures of two or more thereof. Suitable examples of cationic photoinitiators are known to those skilled in the art and include without limitation onium salts such as organic iodonium salts (e.g. diaryl iodoinium salts), oxonium (e.g. triaryloxonium salts) and sulfonium salts (e.g. triarylsuiphonium salts), as well as mixtures of two or more thereof. Other examples of useful photoinitiators can be found in standard textbooks such as "Chemistry & Technology of UV & EB Formulation for Coatings, Inks & Paints", Volume III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited. It may also be advantageous to include a sensitizer in conjunction with the one or more photoinitiators in order to achieve efficient curing. Typical examples of suitable photosensitizers include without limitation isopropyl-thioxanthone (ITX), 1-chloro-2-propoxy-thioxanthone (CPTX), 2-chloro-thioxanthone (CTX) and 2,4-diethyl-thioxanthone (DETX) and mixtures of two or more thereof. The one or more photoinitiators comprised in the UV-Vis-curable coating compositions are preferably present in a total amount from about 0.1 wt-% to about 20 wt-%, more preferably about 1 wt-% to about 15 wt-%, the weight percents being based on the total weight of the UV-Vis-curable coating compositions.

Alternatively, a polymeric thermoplastic binder material or a thermoset may be employed. Unlike thermosets, thermoplastic resins can be repeatedly melted and solidified by heating and cooling without incurring any important changes in properties. Typical examples of thermoplastic resins or polymers include without limitation polyamides, polyesters, polyacetals, polyolefins, styrenic polymers, polycarbonates, polyarylates, polyimides, polyether ether ketones (PEEK), polyetherketeoneketones (PEKK), polyphenylene based resins (e.g. polyphenylenethers, polyphenylene oxides, polyphenylene sulfides), polysulphones and mixtures of two or more of these.

The coating composition described herein may further comprise one or more marker substances or taggants and/or one or more machine readable materials selected from the group consisting of magnetic materials (different from the non-spherical magnetic or magnetisable pigment particles described herein), luminescent materials, electrically conductive materials, and infrared-absorbing materials. As used herein, the term "machine readable material" refers to a material which exhibits at least one distinctive property which is not perceptible by the naked eye, and which can be comprised in a layer so as to confer a way to authenticate said layer or article comprising said layer by the use of a particular equipment for its authentication.

The coating composition described herein may further comprise one or more colouring components selected from the group consisting of organic pigment particles, inorganic pigment particles, and organic dyes, and/or one or more additives. The latter include without limitation compounds and materials that are used for adjusting physical, rheological and chemical parameters of the coating composition such as the viscosity (e.g. solvents, thickeners and surfactants), the consistency (e.g. anti-settling agents, fillers and plasticizers), the foaming properties (e.g. antifoaming agents), the lubricating properties (waxes, oils), UV stability (photostabilizers), the adhesion properties, the antistatic properties, the storage stability (polymerization inhibitors) etc. Additives described herein may be present in the coating composition in amounts and in forms known in the art, including so-called nano-materials where at least one of the dimensions of the additive is in the range of 1 to 1000 nm.

In the OELs comprising the coating composition described herein, the non-spherical magnetic or magnetisable pigment particles described herein are dispersed in the coating composition comprising a hardened binder material that fixes the orientation of the non-spherical magnetic or magnetisable pigment particles. The hardened binder material is at least partially transparent to electromagnetic radiation of one or more wavelengths in the range of 200 nm to 2500 nm. The binder material is thus, at least in its hardened or solid state (also referred to as second state herein), at least partially transparent to electromagnetic radiation of one or more wavelengths in the range of about 200 nm to about 2500 nm, i.e. within the wavelength range which is typically referred to as the "optical spectrum" and which comprises infrared, visible and UV portions of the electromagnetic spectrum, such that the particles contained in the binder material in its hardened or solid state and their orientation-dependent reflectivity can be perceived through the binder material. Preferably, the hardened binder material is at least partially transparent to electromagnetic radiation of one or more wavelengths in the range of 200-800 nm, more preferably in the range of 400-700 nm. Herein, the term "one or more wavelengths" denotes that the binder material may be transparent to only one wavelength in a given wavelength range, or may be transparent to several wavelengths in a given range. Preferably, the binder material is transparent to more than one wavelength in the given range. Thus, in a more preferred embodiment, the hardened binder material is at least partly transparent to all wavelengths in the range from about 200 to about 2500 nm (or 200-800 nm, or 400-700 nm). Herein, the term "transparent" denotes that the transmission of electromagnetic radiation through a layer of 20 µm of the hardened binder material as present in the OEL (not including the non-spherical magnetic or magnetisable pigment particles, but all other optional components of the OEL in case such components are present) is at least 80%, more preferably at least 90%, even more preferably at least 95%, at the wavelength(s) concerned. This can be determined for example by measuring the transmittance of a test piece of the hardened binder material (not including the non-spherical magnetic or magnetisable pigment particles) in accordance with well-established test methods, e.g. DIN 5036-3 (1979-11). If the OEL serves as a covert security feature, then typically technical means will be necessary to detect the (complete) optical effect generated by the OEL under respective illuminating conditions comprising the selected non-visible wavelength; said detection requiring that the wavelength of incident radiation is selected outside the visible range, e.g. in the near UV-range. In this case, it is preferable that the OEL comprises luminescent pigment particles that show luminescence in response to the selected wavelength outside the visible spectrum contained in the incident radiation. The infrared, visible and UV portions of the electromagnetic spectrum approximately correspond to the wavelength ranges between 700-2500 nm, 400-700 nm, and 200-400 nm respectively.

Also described herein are processes for producing the OEL described herein, said processes comprising the steps of:

a) applying on a substrate surface or on a supporting surface of a magnetic-field-generating device the coating composition described herein in a first (fluid) state, b) exposing the coating composition in a first state to the magnetic field of a magnetic-field-generating device, thereby orienting the non-spherical magnetic or magnetisable pigment particles within the coating composition; and c) hardening the coating composition to a second state so as to fix the non-spherical magnetic or magnetisable particles in their adopted positions and orientations.

The applying step a) is preferably carried out by a printing process preferably selected from the group consisting of screen printing, rotogravure printing and flexography printing. These processes are well-known to the skilled man and are described for example in Printing Technology, J. M. Adams and P. A. Dolin, Delmar Thomson Learning, 5 Edition, p 293, 332, and 352.

Subsequently to, partially simultaneously or simultaneously with the application of the coating composition on a substrate surface or a supporting surface of a magnetic-field-generating device, the non-spherical magnetic or magnetisable pigment particles are oriented by the use of an external magnetic field for orienting them according to a desired orientation pattern. Thereby, a permanent magnetic pigment particle is oriented such that its magnetic axis is aligned with the direction of the external magnetic field line at the pigment particle's location. A magnetisable pigment particle without an intrinsic permanent magnetic field is oriented by the external magnetic field such that the direction of its longest dimension is aligned with a magnetic field line at the pigment particle's location. The above applies analogously in the event that the pigment particles should have a layer structure including a layer having magnetic or magnetisable properties. In this case, the magnetic axis of the magnetic layer or the longest axis of the magnetisable layer is aligned with the direction of the magnetic field.

By comprising the non-spherical magnetic or magnetisable pigment particles described herein, the coating composition is well-suited for use in printing OELs such as dynamic, three-dimensional, illusionary, and/or kinematic images by aligning the pigment particles within the coating composition with a magnetic field. A large variety of optical effects for decorative and security applications can be produced by various methods disclosed for example in U.S. Pat. No. 6,759,097, EP 2 165 774 A1 and EP 1 878 773 B1. Optical effects known as flip-flop effects (also referred in the art as switching effect) may be produced. Flip-flop effects include a first printed portion and a second printed portion separated by a transition, wherein pigment particles are aligned parallel to a first plane in the first portion and pigment particles in the second portion are aligned parallel to a second plane. Methods for producing flip-flop effects are disclosed for example in EP 1 819 525 B1 and EP 1 819 525 B1. Optical effects known as rolling-bar effects may also be produced. Rolling-bar effects show one or more contrasting bands which appear to move ("roll") as the image is tilted with respect to the viewing angle, said optical effects are based on a specific orientation of magnetic or magnetisable pigment particles, said pigment particles being aligned in a curving fashion, either following a convex curvature (also referred in the art as negative curved orientation) or a concave curvature (also referred in the art as positive curved orientation. Methods for producing rolling-bar effects are disclosed for example in EP 2 263 806 A1, EP 1 674 282 B1, EP 2 263 807 A1, WO 2004/007095 A2 and WO 2012/104098 A1. Optical effects known as Venetian-blind effects may also be produced. Venetian-blind effects include pigment particles being oriented such that, along a specific direction of observation, they give visibility to an underlying substrate surface, such that indicia or other features present on or in the substrate surface become apparent to the observer while they impede the visibility along another direction of observation. Methods for producing Venetian-blind effects are disclosed for example in U.S. Pat. No. 8,025,952 and EP 1 819 525 81. Optical effects known as moving-ring effects may also be produced. Moving-ring effects consists of optically illusive images of objects such as funnels, cones, bowls, circles, ellipses, and hemispheres that appear to move in any x-y direction depending upon the angle of tilt of said optical effect layer. Methods for producing moving-ring effects are disclosed for example in EP 1 710 756 A1, U.S. Pat. No. 8,343,615, EP 2 306 222 A1, EP 2 325 677 A2, WO 2011/092502 A2 and US 2013/084411.

While the coating composition comprising the non-spherical magnetic or magnetisable pigment particles described herein is still wet or soft enough so that the non-spherical magnetic or magnetisable pigment particles therein can be moved and rotated (i.e. while the coating composition is in a first state), the coating composition is subjected to a magnetic field to achieve orientation of the particles. The step of magnetically orienting the non-spherical magnetic or magnetisable pigment particles comprises a step of exposing the applied coating composition, while it is "wet" (i.e. still liquid and not too viscous, that is, in a first state), to a determined magnetic field generated by the magnetic-field-generating device, thereby orienting the non-spherical magnetic or magnetisable pigment particles along the field lines of the magnetic field such as to form an orientation pattern.

The step of exposing the coating composition comprising the binder material and the non-spherical magnetic or magnetisable pigment particles to a magnetic field (step b)) can be performed either partially simultaneously or simultaneously with the step a) or subsequently to the step a). That is, steps a) and b) may be performed partially simultaneously or simultaneously or subsequently.

The processes for producing the OEL described herein comprise, partially simultaneously with step b) or subsequently to step b), a step c) of hardening the coating composition so as to fix the non-spherical magnetic or magnetisable particles in their adopted positions and orientations in a desired pattern to form the OEL, thereby transforming the coating composition to a second state. By this fixing, a solid coating or layer is formed. The term "hardening" refers to processes including the drying or solidifying, reacting, curing, cross-linking or polymerizing the binder components in the applied coating composition, including an optionally present cross-linking agent, an optionally present polymerization initiator, and optionally present further additives, in such a manner that an essentially solid material that adheres to the substrate surface is formed. As mentioned herein, the hardening step c) may be performed by using different means or processes depending on the binder material comprised in the coating composition that also comprises the non-spherical magnetic or magnetisable pigment particles.

The hardening step generally may be any step that increases the viscosity of the coating composition such that a substantially solid material adhering to the supporting surface is formed. The hardening step may involve a physical process based on the evaporation of a volatile component, such as a solvent, and/or water evaporation (i.e. physical drying). Herein, hot air, infrared or a combination of hot air and infrared may be used. Alternatively, the hardening process may include a chemical reaction, such as a curing, polymerizing or cross-linking of the binder and optional initiator compounds and/or optional cross-linking compounds comprised in the coating composition. Such a chemical reaction may be initiated by heat or IR irradiation as outlined above for the physical hardening processes, but may preferably include the initiation of a chemical reaction by a radiation mechanism including without limitation Ultraviolet-Visible light radiation curing (hereafter referred as UV-Vis curing) and electronic beam radiation curing (E-beam curing); oxypolymerization (oxidative reticulation, typically induced by a joint action of oxygen and one or more catalysts preferably selected from the group consisting of cobalt-containing catalysts, vanadium-containing catalysts, zirconium-containing catalysts, bismuth-containing catalysts, and manganese-containing catalysts); cross-linking reactions or any combination thereof.

Radiation curing is particularly preferred, and UV-Vis light radiation curing is even more preferred, since these technologies advantageously lead to very fast curing processes and hence drastically decrease the preparation time of any article comprising the OEL described herein. Moreover, radiation curing has the advantage of producing an almost instantaneous increase in viscosity of the coating composition after exposure to the curing radiation, thus minimizing any further movement of the particles. In consequence, any loss of information after the magnetic orientation step can essentially be avoided. Particularly preferred is radiation-curing by photo-polymerization, under the influence of actinic light having a wavelength component in the UV or blue part of the electromagnetic spectrum (typically 200 nm to 650 nm; more preferably 200 nm to 420 nm). Equipment for UV-visible-curing may comprise a high-power light-emitting-diode (LED) lamp, or an arc discharge lamp, such as a medium-pressure mercury arc (MPMA) or a metal-vapour arc lamp, as the source of the actinic radiation. The hardening step c) can be performed either partially simultaneously with the step b) or subsequently to the step b). However, the time from the end of step b) to the beginning of step c) is preferably relatively short in order to avoid any de-orientation and loss of information. Typically, the time between the end of step b) and the beginning of step c) is less than 1 minute, preferably less than 20 seconds, further preferably less than 5 seconds, even more preferably less than 1 second. It is particularly preferable that there is essentially no time gap between the end of the orientation step b) and the beginning of the hardening step c), i.e. that step c) follows immediately after step b) or already starts while step b) is still in progress.

If desired, a primer layer may be applied to the substrate prior to the step a). This may enhance the quality of the OEL described herein or promote adhesion. Examples of such primer layers may be found in WO 2010/058026 A2.

With the aim of increasing the durability through soiling or chemical resistance and cleanliness and thus the circulation lifetime of an article, a security document or a decorative element or object comprising the OEL described herein, or with the aim of modifying their aesthetical appearance (e.g. optical gloss), one or more protective layers may be applied on top of the OEL. When present, the one or more protective layers are typically made of protective varnishes. These may be transparent or slightly coloured or tinted and may be more or less glossy. Protective varnishes may be radiation curable compositions, thermal drying compositions or any combination thereof. Preferably, the one or more protective layers are radiation curable compositions, more preferable UV-Vis curable compositions. The protective layers may be applied after the formation of the DEL.

The OELs described herein may be provided directly on a substrate on which it shall remain permanently (such as for banknote applications). Alternatively, an DEL may also be provided on a temporary substrate for production purposes, from which the OEL is subsequently removed. This may for example facilitate the production of the OEL, particularly while the binder material is still in its fluid state. Thereafter, after hardening the coating composition for the production of the OEL, the temporary substrate may be removed from the OEL. Of course, in such cases the coating composition must be in a form that is physically integral after the hardening step, such as for instances in cases where a plastic-like or sheet-like material is formed by the hardening. Thereby, a film-like transparent and/or translucent material consisting of the OEL as such (i.e. essentially consisting of oriented magnetic or magnetisable pigment particles having non-isotropic reflectivity, hardened binder components for fixing the pigment particles in their orientation and forming a film-like material, such as a plastic film, and further optional components) can be provided.

Alternatively, in another embodiment an adhesive layer may be present on the OEL. Alternatively, an adhesive layer may be present on a substrate comprising an OEL, said adhesive layer being on the side opposite the side where the DEL is provided or on the same side as the OEL and on top of the OEL. Therefore an adhesive layer may be applied to the OEL or to a substrate comprising the OEL, said adhesive layer being preferably applied after the hardening step has been completed. In such instances, an adhesive label comprising the adhesive layer and the OEL or an adhesive layer, the OEL and the substrate as the case may be is formed. Such a label may be attached to all kinds of documents or other articles or items without printing or other processes involving machinery and rather high effort.

Also described herein are optical effect coated substrates comprising one or more optical effect layers such as those described herein. The OECs described herein may comprise a substrate on which the DEL shall remain permanently (such as for banknote applications). Alternatively, the OECs described herein may be in the form of a transfer foil, which can be applied to a document or to an article in a separate transfer step. For this purpose, the substrate is provided with a release coating, on which an OEL is produced as described herein. One or more adhesive layers may be applied over the so produced OEL.

According to one embodiment of the present invention, the optical effect coated substrate comprises more than one OEL on the substrate described herein, for example it may comprise two, three, etc. OELs. The OEC may comprise a first OEL and a second OEL, wherein both of them are present on the same side of the substrate or wherein one is present on one side of the substrate and the other one is present on the other side of the substrate. If provided on the same side of the substrate, the first and the second OELs may be adjacent or not adjacent to each other. Additionally or alternatively, one of the OELs may partially or fully superimpose the other OEL. The magnetic orientation of the non-spherical magnetic or magnetisable pigment particles for producing the first OEL and of the non-spherical magnetic or magnetisable pigment particles for producing the second OEL may be performed simultaneously or sequentially, with or without intermediate hardening or partial hardening of the binder material.

The substrate described herein is preferably selected from the group consisting of papers or other fibrous materials, such as cellulose, paper-containing materials, glasses, metals, ceramics, plastics and polymers, metallized plastics or polymers, composite materials and mixtures or combinations of two or more thereof. Typical paper, paper-like or other fibrous materials are made from a variety of fibres including without limitation abaca, cotton, linen, wood pulp, and blends thereof. As is well known to those skilled in the art, cotton and cotton/linen blends are preferred for banknotes, while wood pulp is commonly used in non-banknote security documents. Typical examples of plastics and polymers include polyolefins such as polyethylene (PE) and polypropylene (PP), polyamides, polyesters such as poly(ethylene terephthalate) (PET), poly(1,4-butylene terephthalate) (PBT), poly(ethylene 2,6-naphthoate) (PEN) and polyvinylchlorides (PVC). Spunbond olefin fibres such as those sold under the trademark Tyvek® may also be used as substrate. Typical examples of metalized plastics or polymers include the plastic or polymer materials described hereabove having a metal disposed continuously or discontinuously on their surface. Typical example of metals include without limitation aluminium (Al), chromium (Cr), copper (Cu), gold (Au), silver (Ag), alloys thereof and combinations of two or more of the aforementioned metals. The metallization of the plastic or polymer materials described hereabove may be done by an electrodeposition process, a high-vacuum coating process or by a sputtering process. Typical examples of composite materials include without limitation multilayer structures or laminates of paper and at least one plastic or polymer material such as those described hereabove as well as plastic and/or polymer fibres incorporated in a paper-like or fibrous material such as those described hereabove. Of course, the substrate can comprise further additives that are known to the skilled person, such as sizing agents, whiteners, processing aids, reinforcing or wet strengthening agents etc.

With the aim of further increasing the security level and the resistance against counterfeiting and illegal reproduction of security documents, the substrate may comprise printed, coated, or laser-marked or laser-perforated indicia, watermarks, security threads, fibres, planchettes, luminescent compounds, windows, foils, decals and combinations thereof. With the same aim of further increasing the security level and the resistance against counterfeiting and illegal reproduction of security documents, the substrate may comprise one or more marker substances or taggants and/or machine readable substances (e.g. luminescent substances, UV/visible/IR absorbing substances, magnetic substances and combinations thereof).

The OELs described herein may be used for decorative purposes as well as for protecting and authenticating a security document. The present invention also encompasses decorative elements or objects comprising the DEL described herein. The decorative elements or objects described herein may comprise more than one optical effect layers described herein. Typical examples of decorative elements or objects include without limitation luxury goods, cosmetic packaging, automotive parts, electronic/electrical appliances, furniture and fingernail lacquers.

An important aspect of the present invention relates to security documents comprising the OELs described herein. The security document may comprise more than one optical effect layer described herein. The present invention provides security documents as well as decorative elements or objects comprising one or more optical effect layers.

Security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets or titles and the like, preferably banknotes, identity documents, right-conferring documents, driving licenses and credit cards. The term "value commercial good" refers to packaging materials, in particular cosmetic articles, nutraceutical articles, pharmaceutical articles, alcohols, tobacco articles, beverages or foodstuffs, electrical/electronics articles, fabrics or jewelry, i.e. articles that shall be protected against counterfeiting and/or illegal reproduction in order to warrant the content of the packaging like for instance genuine drugs. Examples of these packaging materials include without limitation labels, such as authentication brand labels, tamper evidence labels and seals. It is pointed out that the disclosed substrates, value documents and value commercial goods are given exclusively for exemplifying purposes, without restricting the scope of the invention.

Alternatively, the OEL may be produced onto an auxiliary substrate such as for example a security thread, security stripe, a foil, a decal, a window or a label and consequently transferred to a security document in a separate step.

The skilled person can envisage several modifications to the specific embodiments described above without departing from the spirit of the present invention. Such modifications are encompassed by the present invention.

Further, all documents referred to throughout this specification are hereby incorporated by reference in their entirety as set forth in full herein.

The present invention will now be described by way of Examples, which are however not intended to limit its scope in any way.

EXAMPLES

TABLE 1

| | |
|---|---|
| Epoxyacrylate oligomer | 36% |
| Trimethylolpropane triacrylate monomer | 13% |
| Tripropyleneglycol diacrylate monomer | 20% |
| Genorad 16 (Rahn) | 1% |
| Aerosil 200 ® (Evonik) | 1% |
| Speedcure TPO-L (Lambson) | 2% |
| Irgacure ® 500 (BASF) | 6% |
| Genocure EPD (Rahn) | 2% |
| BYK ®-053 (BYK) | 2% |
| 7-layer optically variable magnetic pigment particles (*) | 17% |

(*) 7-layer gold-to-green platelet-shaped optically variable magnetic pigment particles with particle size provided in Table 2 and a thickness of about 1 μm, obtained from JDS-Uniphase, Santa Rosa, CA.

The coating composition described in Table 1 was applied on a standard cotton based substrate and a polymer banknote substrate (820×700 mm, BNP standard paper 90 g/m² from Papierfabrik Louisenthal, and Guardian polymer substrate from Securency, respectively) by screen printing on a KBA-Notasys NotaScreen® press, at 6000 sheets/hour using a NotaMesh® 195 mesh screen.

An OEL exhibiting a rolling bar effect was obtained by applying the coating composition described in Table 1 on the standard cotton based substrate described hereabove. The orientation of the platelet-shaped optically variable magnetic pigment particles was obtained by exposing the coating composition to the magnetic field of a magnetic-field-generating device disclosed in U.S. Pat. No. 7,047,883.

An OEL exhibiting a 50-indicium and a rolling bar effect was obtained by applying the coating composition described in Table 1 on the polymer banknote substrate described hereabove. The orientation of the platelet-shaped optically variable magnetic pigment particles was obtained by exposing the coating composition to the magnetic field of a magnetic-field-generating device disclosed in WO 2008/046702 A1.

The so-obtained magnetic orientation patterns of the platelet-shaped optically variable pigment particles within the coating composition were, subsequently to the application step and partially simultaneously with the exposure step to the magnetic-field-generating device (as described in WO 2012/038531 A1), fixed by UV-curing (Phoseon Technology LED UV RX FireFlex™ 75x50WC395-8W). The OELs were subsequently fully cured by passing them under a UV curing device (two IST Hg Fe-doped lamps of 188 W/cm each, equipped with BLK-5 reflectors).

D10, d50 and d90 values of the platelet-shaped optically variable magnetic pigment particles provided in Table 2 were measured with a Malvern Morphologi G3. The sample preparation consisted of 0.2 wt-% pigment dispersion in a solvent-based varnish, said dispersion being applied on glass microscope slides by screen-printing using a T90 mesh.

Chroma C* values according to CIE L*a*b* (1976) are provided in Table 2. The CIELab color space is defined by the Commission Internationale de l'Eclairage (CIE) in 1976 and represents a three-dimensional, rectangular coordinate system. The term "CIE (1976) parameters" is to be understood according to ISO 11664-4:2008. Some examples may be found in standard textbooks e.g "Coloristik für Lackanwendungen", Iasso Bäurle et al., Farbe und Lack Edition, 2012, ISBN 978-3-86630-869-5. Chroma C* values were measured with a Phyma multi-angle spectrophotometer CODEC WICO 5&5 (9 mm aperture, D65 illumination, 10 Deg observer, CIELab 1976 colour system). The (22.5°/0°) measurement geometry that was used in this case refers to the illumination and detection angles respectively (i.e. illumination at 22.5° from the perpendicular to the sample surface, detection perpendicular to the sample). This measurement geometry characterises the face colour of colour-shifting samples. Chroma C* values were measured on samples wherein the exposure of the coating composition to the magnetic field was not carried out, i.e. on samples comprising pigment particles randomly oriented in a hardened binder.

OEL brightness and effect contrast were quantified by performing measurements on greyscale digital photographic images such as those shown in FIGS. 1A-1-F further described below. The lightness of selected areas in the images, such as dark and bright areas, is determined by reading the average pixel intensity values (for 8-bit images the pixel values is in the range 0-255) in the selected area using commercially available software packages (e.g. Adobe Photoshop CS4). Average pixel values for bright areas are reported as $V_b$, and average pixel values for dark areas are reported as $V_d$. Furthermore, the contrast of each image is numerically evaluated by comparing average values of bright and dark areas in each photograph. Image or OEL contrast can be defined in different ways; here Michelson's definition of visibility has been chosen to express contrast: Visibility=$(V_b-V_d)/(V_b+V_d)$ (Michelson, A. A. (1927). Studies in Optics. U. of Chicago Press).

Photographic images (Lighting: Reflecta LED Videolight RPL49, Objective: AF-S Micro Nikkor 105 mm 1:2.8 G ED; Camera: Nikon D800, manual exposure, with automatic digital image enhancement options disabled for consistency) of OELs comprising the platelet-shaped optically variable magnetic pigment particles oriented so as to form a rolling bar effect are shown in FIGS. 1A-1F, wherein FIG. 1A corresponds to OELs comprising platelet-shaped optically variable magnetic pigment particles having a d50 value of 17 μm; FIG. 1B corresponds to OELs comprising platelet-shaped optically variable magnetic pigment particles having a d50 value of 13 μm; FIG. 1C corresponds to OELs comprising platelet-shaped optically variable magnetic pigment particles having a d50 value of 9.3 μm; FIG. 1D corresponds to OELs comprising platelet-shaped optically variable magnetic pigment particles having a d50 value of 7.4 μm; FIG. 1E corresponds to OELs comprising platelet-shaped optically variable magnetic pigment particles having a d50 value of 6.4 μm and FIG. 1F corresponds to OELs comprising platelet-shaped optically variable magnetic pigment particles having a d50 value of 4.5 μm, wherein dotted line area b was used to determine bright area values, area d to determine dark area values for Michelson contrast determinations. In FIGS. 1A-1F, x represents the distance between the extremity of the OEL and the centre of the rolling bar and is 6 mm.

Figures 2A, 2B, 2C:
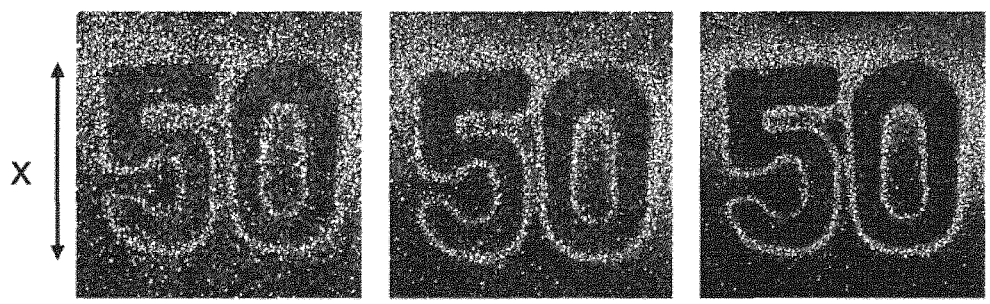
FIG. 2A-2F Photographic images of OELs exhibiting a 50 indicium and a rolling bar effect, said OELs comprising magnetically oriented non-spherical magnetic or magnetisable pigment particles of different sizes.
Figures 2D, 2E, 2F:
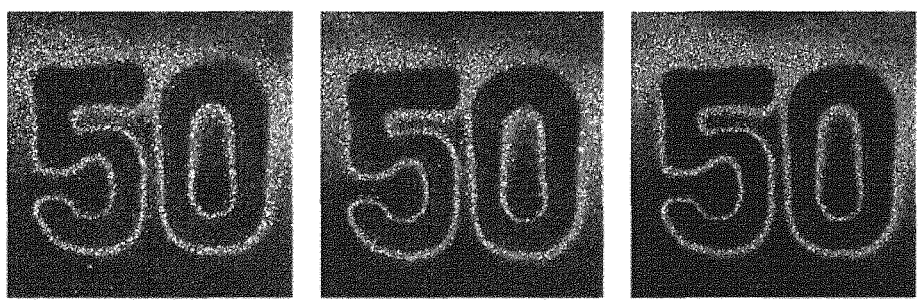

Photographic images of OELs comprising the platelet-shaped optically variable magnetic pigment particles oriented so as to exhibit a 50 indicium are shown in FIGS. 2A-2F, wherein FIG. 2A corresponds to OELs comprising platelet-shaped optically variable magnetic pigment particles having a d50 value of 17 μm; FIG. 2B corresponds to OELs comprising platelet-shaped optically variable magnetic pigment particles having a d50 value of 13 μm; FIG. 2C corresponds to OELs comprising platelet-shaped optically variable magnetic pigment particles having a d50 value of 9.3 μm; FIG. 2D corresponds to OELs comprising platelet-shaped optically variable magnetic pigment particles having a d50 value of 7.4 μm; FIG. 2E corresponds to OELs comprising platelet-shaped optically variable magnetic pigment particles having a d50 value of 6.4 μm and FIG. 2F corresponds to OELs comprising platelet-shaped optically variable magnetic pigment particles having a d50 value of 4.5 μm. In FIGS. 2A-2F, x represents the dimension of the 50-indicium and is 3 mm.

TABLE 2

| CE diameter d10 [μm] | CE diameter d50 [μm] | CE diameter d90 [μm] | | Chroma C* (22.5°/0°) | Bright Value $V_b$ | Dark Value $V_d$ | Michelson Contrast $(V_b - V_d)/(V_b + V_d)$ |
|---|---|---|---|---|---|---|---|
| 8.7 | 17 | 28 | FIG. 1A, 2A | 39 | 147.1 | 76.1 | 0.318 |
| 6.8 | 13 | 20 | FIG. 1B, 2B | 35 | 148.4 | 66.9 | 0.379 |
| 5.2 | 9.3 | 15 | FIG. 1C, 2C | 32 | 154.7 | 56 | 0.468 |
| 4.1 | 7.4 | 12 | FIG. 1D, 2D | 30 | 150.7 | 58.5 | 0.441 |
| 3.3 | 6.4 | 11 | FIG. 1E, 2E | 28 | 148.6 | 57.8 | 0.440 |
| 2.5 | 4.5 | 7.3 | FIG. 1F, 2F | 26 | 139.9 | 54.9 | 0.436 |

The non-spherical magnetic or magnetisable pigment particles having a d50 value higher than 6 μm and lower than 13 μm, preferably from about 7 μm to about 10 μm, and preferably combining a d50 value higher than 6 μm and lower than 13 μm, preferably from about 7 μm to about 10 μm, with a d90 value lower than 20 μm, preferably lower than or equal to about 15 μm, described herein allow the production of optical effect layers exhibiting a combination of high brightness, high contrast, high resolution and reduced sparkling. Moreover, the non-spherical magnetic or magnetisable pigment particles described herein allow the production of OELs not suffering from an imperfect alignment of the pigment particles and a graininess as shown hereabove, said drawback being known when pigment particles with an inadequately selected particle size are used.

The invention claimed is:

1. Non-spherical magnetic or magnetizable pigment particles comprising: at least one of:
    a magnetic metal selected from the group consisting of cobalt, iron, gadolinium and nickel;
    a magnetic alloy of iron, manganese, cobalt, nickel or a mixture of two or more thereof; and a magnetic oxide of chromium, manganese, cobalt, iron, nickel or a mixture of two or more thereof;

wherein the particles have a d50 value that is higher than 6 µm and lower than 13 µm in combination with a d90 value lower than 20 µm, wherein the d50 and d90 values are determined by circle equivalent diameters as a percent of the cumulative volume of the particles.

2. The non-spherical magnetic or magnetizable pigment particles according to claim 1, comprising a mixture of at least two of:
the magnetic metal selected from the group consisting of cobalt, iron, gadolinium and nickel;
the magnetic alloy of iron, manganese, cobalt, nickel or a mixture of two or more thereof; and
the magnetic oxide of chromium, manganese, cobalt, iron, nickel or a mixture of two or more thereof.

3. The non-spherical magnetic or magnetizable pigment particles according to claim 1, wherein the d50 value is between about 7 µm to about 10 µm and the d90 value is lower than 15 µm.

4. The non-spherical magnetic or magnetizable pigment particles according to claim 1, wherein the d50 value is between about 7 µm to about 10 µm.

5. The non-spherical magnetic or magnetizable pigment particles according to claim 1, wherein the d90 value is lower than 15 µm.

6. The non-spherical magnetic or magnetizable pigment particles according to claim 1 being platelet-shaped pigment particles.

7. The non-spherical magnetic or magnetizable pigment particles according to claim 1, wherein at least a part of the non-spherical magnetic or magnetizable pigment particles comprise non-spherical optically variable magnetic or magnetizable pigment particles.

8. The non-spherical magnetic or magnetizable pigment particles according to claim 7, wherein the non-spherical optically variable magnetic or magnetizable pigment particles are selected from the group consisting of magnetic thin-film interference pigment particles, magnetic cholesteric liquid crystal pigment particles, interference coated pigment particles comprising a magnetic material and mixtures of two or more thereof.

9. The non-spherical magnetic or magnetizable pigment particles according to claim 8, wherein the magnetic thin-film interference pigment particles comprise a 5-layer Fabry Perot absorber/dielectric/reflector/dielectric/absorber multilayer structure, in which the reflector layer and/or the absorber layer is a magnetic layer comprising nickel, iron and/or cobalt, and/or a magnetic alloy comprising nickel, iron and/or cobalt and/or a magnetic oxide comprising nickel (Ni), iron (Fe) and/or cobalt (Co).

10. The non-spherical magnetic or magnetizable pigment particles according to claim 9, wherein the dielectric layers are independently made from one or more selected from the group consisting of magnesium fluoride and silicium dioxide.

11. The non-spherical magnetic or magnetizable pigment particles according to claim 8, wherein the magnetic thin-film interference pigment particles comprise a 7-layer Fabry Perot absorber/dielectric/reflector/magnetic/reflector/dielectric/absorber multilayer structure or a 6-layer Fabry-Perot multilayer absorber/dielectric/reflector/magnetic/dielectric/absorber multilayer structure, and wherein the magnetic layer comprises nickel, iron and/or cobalt; and/or a magnetic alloy comprising nickel, iron and/or cobalt and/or a magnetic oxide comprising nickel, iron and/or cobalt.

12. The non-spherical magnetic or magnetizable pigment particles according to claim 11, wherein the reflector layers are independently made from at least one selected from the group consisting of aluminum, chromium, nickel, and alloys thereof; and/or the dielectric layers are independently made from one or more selected from the group consisting of magnesium fluoride and silicium dioxide; and/or the absorber layers are independently made from one or more selected from the group consisting of chromium, nickel and alloys thereof.

13. A use of the non-spherical magnetic or magnetizable pigment particles recited in claim 1 in a coating composition comprising a binder material for producing an optical effect layer (OEL).

14. A coating composition for producing an optical effect layer (OEL), said coating composition comprising the non-spherical magnetic or magnetizable pigment particles recited in claim 1 and a binder material.

15. An optical effect layer (OEL) comprising the coating composition recited in claim 14 in hardened form, wherein the non-spherical magnetic or magnetizable pigment particles are magnetically oriented.

16. An optical effect coated substrate (OEC) comprising:
at least one of the optical effect layer (OEL) recited in claim 15 on a substrate.

17. A method comprising:
one of:
protecting a security document against counterfeiting or fraud by applying the optical effect coated substrate (OEC) recited in claim 16, or
decorating a further substrate by applying the optical effect coated substrate.

18. A method comprising:
providing at least one of the optical effect layer (OEL) recited in claim 15 on a substrate to one of: protect the substrate, which is formed as a security document, against counterfeiting or fraud; or decorate the substrate.

19. A security document or a decorative element or object comprising one or more optical effect layers (OELs) recited in claim 15.

20. A process for producing an optical effect layer (OEL) comprising:
a) applying, on a substrate surface or on a supporting surface of a magnetic-field generating device, the coating composition recited in claim 14, said coating composition being in a first state,
b) exposing the coating composition in a first state to a magnetic field of the magnetic field-generating device, thereby orienting at least a part of the non-spherical magnetic or magnetizable pigment particles, and
c) hardening the coating composition to a second state that fixes the non-spherical magnetic or magnetizable pigment particles in the oriented positions.

21. The process according to claim 20, wherein the hardening occurs at least partially simultaneously with the exposing of the coating composition to the first magnetic field.

* * * * *